Dec. 2, 1952          D. E. CROOKER          2,619,678
METHOD OF AND APPARATUS FOR THE MANUFACTURE OF NONSKID TIRE TREADS
Filed Feb. 16, 1948          2 SHEETS—SHEET 1
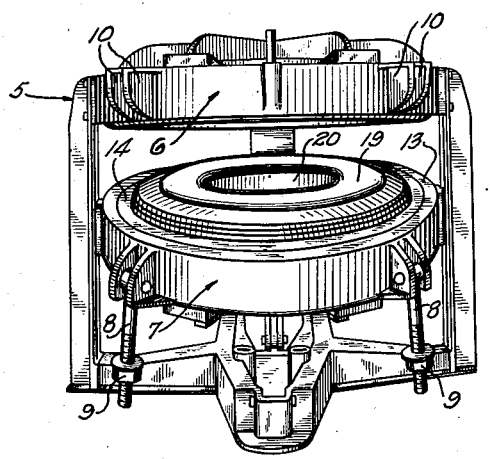
Fig. 1.
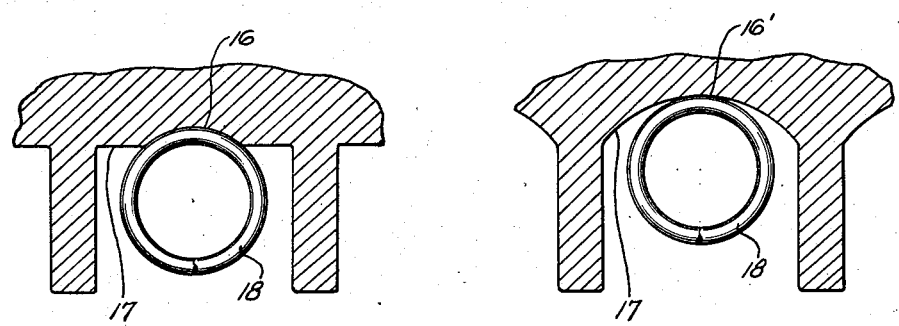
Fig. 3.          Fig. 4.
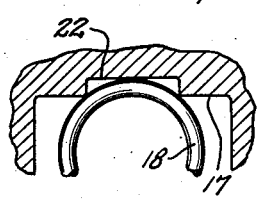 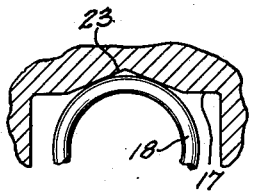
Fig. 5.          Fig. 6.
INVENTOR,
David E. Crooker
BY
Morsell & Morsell
ATTORNEYS.

Dec. 2, 1952 D. E. CROOKER 2,619,678
METHOD OF AND APPARATUS FOR THE MANUFACTURE OF NONSKID TIRE TREADS
Filed Feb. 16, 1948 2 SHEETS—SHEET 2

INVENTOR.
David E. Crooker
BY
Morsell & Morsell
ATTORNEYS.

Patented Dec. 2, 1952

2,619,678

UNITED STATES PATENT OFFICE 2,619,678

METHOD OF AND APPARATUS FOR THE MANUFACTURE OF NONSKID TIRE TREADS

David E. Crooker, Ontonagon, Mich., assignor of one-half to Lloyd L. Felker, Marshfield, Wis.

Application February 16, 1948, Serial No. 8,646

26 Claims. (Cl. 18—18)

This invention relates to improvements in the method of and apparatus for the manufacture of non-skid tire treads.

The tire industry has recognized the need for an automobile tire which will provide aedquate traction on icy streets or in other places where conventional automobile tires fail to grip, and are for that reason unsafe. Many types of construction have been proposed, and the type wherein metal traction augmenting members, such as coils are molded longitudinally into the tread or rider strips of the tire has been found to have particular merit. Certain difficulties, however, have been encountered in the manufacture of this type of tire.

The original manufacture of a tire and a retreading operation are very similar. In fact, the retreading operation involves some of same steps as original tire manufacture, and during these steps, very similar equipment is employed in both. In the curing stage of both operations the tire casing surrounds an inflatable annular core and is surrounded by a steam jacketed annular matrix. The core is inflated and the pressure therefrom (which is similar to the action of an inflated inner tube) forces the uncured rubber of the tire against the hot matrix. The matrix is formed on its tire engaging surface with a contour which corresponds to the contour desired on the finished tire. The uncured rubber is forced into the pattern of the matrix, and after a predetermined period of exposure to the heat and pressure above mentioned, the curing of the rubber is complete and the tire is removed from the matrix.

In the manufacture of tires having coils embedded in the threads thereof, a matrix having spaced circumferentially extending rectangular grooves has heretofore been used. The circumferential rectangular grooves formed similar spaced circumferentially extending tread or rider strips on the tire cured in the matrix. In order to embed coils in the rider strips of the tire, the coils have been placed in the grooves of the matrix prior to the placement of the uncured tire within the matrix. It is very important that the wire coils be laterally centered in the rider strips of the finished tire and in the method as heretofore proposed, difficulty has been encountered in maintaining the wire coils laterally centered in the rectangular grooves of the matrix. In order to have the coils laterally centered in the rider strips of the finished tire, the coils must be maintained in laterally centered position in the matrix grooves throughout the curing operation.

With the above in mind, the principal object of the invention is to provide a method of and apparatus for the manufacture of non-skid tire treads of the type having wire coils embedded therein, wherein the wire coils are maintained in laterally centered position in the grooves of the matrix throughout the curing operation.

A further object of the invention is to provide a method of and apparatus for the manufacture of non-skid tire treads of the class described, wherein the wire coils are maintained in laterally centered position in the grooves of the matrix without requiring special tools or attachments in addition to those conventionally used.

A further more specific object of the invention is to provide an annular tire matrix or mold, the interior of which is formed with spaced circumferentially extending grooves having the bottom surfaces of each groove formed with a longitudinally extending concavity, the deepest portion of said concavity being laterally centered in the groove.

With the above and other objects in view, the invention consists in the improved method of and apparatus for the manufacture of non-skid tire treads, and all of the steps, parts and combinations incident thereto, and all equivalents thereof.

A clear conception of the steps of the improved method and of the construction of the improved apparatus may be had by referring to the drawing accompanying and forming a part of this specification, wherein like reference characters designate the same parts in all of the views:

Fig. 1 is a perspective view of a tire molding machine;

Fig. 3 is an enlarged fragmentary transverse sectional view taken through a matrix embodying the preferred form of circumferential groove; and Figs. 4, 5, and 6 are enlarged fragmentary transverse sectional views taken through a matrix and showing three different modified forms of the improved circumferential groove.

Figure 2:
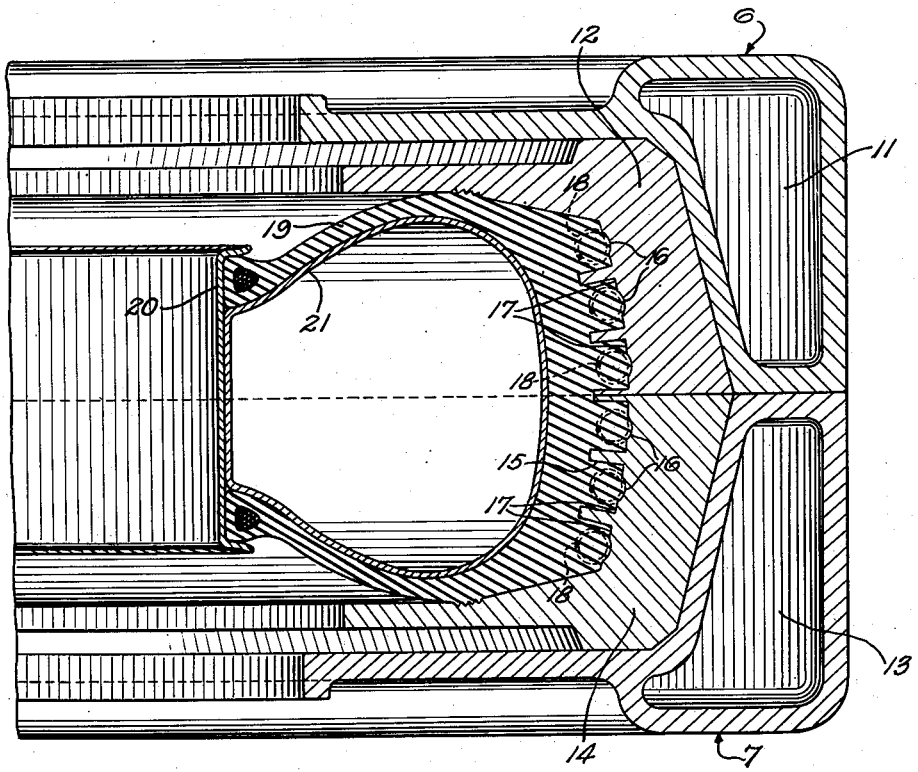
Fig. 2 is a fragmentary transverse sectional view taken through a portion of the mold during a curing operation.

Referring more particularly to Fig. 1 of the drawing, the numeral 5 indicates one type of tire molding machine having a stationary annular upper mold section 6 and having a movable annular lower mold section 7. The lower mold section 7 may be moved by any suitable actuating mechanism into registration with the upper mold section 6, and the sections may be removably bolted together by engagement of the bolts 8 and the nuts 9 of the lower section 7 with the lugs 10 of the upper section 6.

Each of the mold sections 6 and 7 is provided with an annular matrix section and with an annular steam jacket section extending around said matrix section and supporting the same. The upper mold section 6 comprises the upper steam jacket 11 and the upper matrix section 12, and the lower mold section 7 comprises the lower steam jacket 13 and the lower matrix section 14. The matrix sections 12 and 14 are formed on their inner surfaces, as at 15 in Fig. 2, with a pattern corresponding to the tread to be formed on the tire which is to be cured therein.

In the manufacture of non-skid tire treads having wire coils embedded in the rider strips thereof as heretofore proposed, a matrix having spaced rectangular grooves extending circumferentially around the inner surface thereof has been used. This type of matrix pattern produced a tread in the form of spaced rectangularly shaped longitudinally extending rider strips having substantially flat wearing surfaces. The coils have been inserted in the matrix grooves prior to the placement of the uncured tire in the matrix, and particular difficulty has heretofore been encountered in attempts to maintain the coils in laterally centered position in the grooves of the matrix during the curing operation. There has heretofore been a tendency for the coils to assume a wavy configuration, or to be urged against one side of the groove by the force of gravity.

In the present invention, in order to provide a means for maintaining the coils in laterally centered position in the rectangular grooves of the matrix, the matrix is formed with a longitudinal concavity or channel 16 in the bottom of each of the spaced circumferentially extending grooves 17. The preferred form of concavity is shown in Figs. 2 and 3. It occupies only a portion of the bottom surface of the otherwise substantially rectangular groove 17 and is laterally centered therein as shown. A modified form of the invention is shown in Fig. 4, wherein the concavity 16' comprises the entire bottom of the groove 17. In the preferred form of the invention the radius of curvature of the concavity 16 is substantially equal to the radius of curvature of the outside of the coil 18 to be embedded in the rider strip of the finished tire.

While it is preferred to use a longitudinal concavity which is curved in cross section, as shown in Fig. 3, any longitudinal recess that is milled or machined or otherwise provided in the bottoms of the rider strip grooves and which is capable of centering traction augmenting members such as springs is within the scope of the invention. Two of such modified shapes are indicated in Figs. 5 and 6. In Fig. 5 the numeral 22 designates a longitudinal concavity which is rectangular in cross section and which functions the same as the concavity 16, and the numeral 23 in Fig. 6 designates a V-shaped concavity which functions the same as the concavity 16 of Fig. 3.

In a retreading operation, when it is desired to manufacture a non-skid tread in accordance with the improved method, a matrix provided with spaced circumferentially extending grooves 17 of the type shown in Figs. 2 and 3 is used. One coil 18 for each groove 17 of the matrix is cut to a length slightly longer than the circumference of the base of the groove 17. Experience has shown that a length of spring approximately four inches longer than the circumference of the base of the groove 17 is satisfactory. The springs 18 are then placed in the respective grooves 17 with the ends abutting and with a side portion seated in the concavity 16 in the base of the groove 17, as shown in Fig. 3. Because of the outward pressure exerted by the springs 18 due to the fact that they are longitudinally compressed (having been cut four inches longer than the space they now occupy), the springs 18 maintain themselves firmly seated in the concavities 16 and are thereby centered laterally in the grooves 17.

After the springs 18 have been positioned in the grooves 17, a tire 19 to be retreaded, mounted on a suitable rim 20 and having inserted therein an inflatable annular bag or core 21, is prepared for the curing operation. This consists in smoothing off the wearing surface thereof and cementing to the smoothed surface a layer of uncured rubber or "camelback." The tire is then placed in axially centered position between the open halves 12 and 14 of the matrix. The lower mold section 7 is then brought up into registration with the upper mold section and is bolted tightly thereto by means of the bolts 8, the nuts 9, and the lugs 10. This brings the lower matrix section 14 in close registration with the upper matrix section 12.

Steam is then introduced into the steam jackets 11 and 13, and the annular core or bag 21 is then inflated. The expanding pressures created by the core 21 expands the tire casing and forces the uncured rubber "camelback" into contact with the matrix pattern 15. Said pattern consists of the spaced grooves 17 with the springs 18 seated in the concavities 16 of said grooves. Under the heat from the steam jackets 11 and 13, and under the pressure from the core 21, the uncured rubber of the "camelback" flows into the grooves 17, into the concavities 16, and around the springs 18, to conform to the matrix pattern 15 as shown in Fig. 2. With continued application of predetermined amounts of heat and pressure for a predetermined period of time, the uncured "camelback" becomes cured. It will be noted that during the entire curing operation, from the time of their insertion into the matrix, the springs 18 remain firmly seated in the concavities 16 of the grooves 17. Due to the fact that portions of the convolutions of the coils project into the concavity 16, said portions necessarily project into the heated mold portions beyond the bottoms 17 of the grooves. Thus heat from the portions 12 and 14 of the mold is conducted by the metal of the coils into the rubber tread which is being formed. As a result a speedier and more uniform cure is obtained because of the position of the coils wherein portions project inwardly beyond the bottoms 17 of the grooves. After the "camelback" has been cured, the steam is shut off from the jackets 11 and 13, the bag or core 21 is deflated, and the lower mold section 7 is unbolted from the upper mold section 6 and lowered to the position of Fig. 1. The retreaded tire 19 is then removed from the mold, and the rim 20 and core 21 are also removed. The tire is then ready for use.

Various changes and modifications may be made without departing from the spirit of the invention, and all of such changes are contemplated as may come within the scope of the claims.

What I claim is:

1. In a tire molding machine, a matrix having its tread molding surface formed with at least one circumferentially extending groove having a bottom wall and which is substantially rectangular in cross section, the bottom wall of said groove being formed with a longitudinally extending concavity for receiving and positioning a circular traction augmenting member.

2. In a tire molding machine, a matrix having its tread molding surface formed with at least one circumferentially extending groove having a bottom wall and which is substantially rectangular in cross section, the bottom wall of said groove being formed with a laterally centered, longitudinally extending concavity for receiving and positioning a circular traction augmenting member.

3. In a tire molding machine, a matrix having its tread molding surface formed with at least one circumferentially extending groove having a bottom wall and which is substantially rectangular in cross section, the bottom wall of said groove being formed with a laterally centered, longitudinally extending concavity for receiving and positioning a circular traction augmenting member, said concavity having a radius of curvature which is not substantially longer than half the width of the groove.

4. In a tire molding machine, a matrix having its tread molding surface formed with at least one circumferentially extending groove having a bottom wall and which is substantially rectangular in cross section, the bottom wall of said groove being formed with a laterally centered, longitudinally extending concavity for receiving and positioning a circular traction augmenting member, said concavity having a width less than that of the groove.

5. A tire retreading device comprising a cylindrical mold member having a plurality of axially spaced inwardly directed generally parallel circumferential design forming ribs, and means carried by said member and disposed between each two adjacent ribs constructed and arranged to support and center a wire coil skid resisting means between each two adjacent ribs.

6. The method of forming non-skid tire treads with the use of a tire molding machine of the type which has circumferential rider strip forming grooves comprising: longitudinally compressing elongated traction augmenting coils the convolutions of which are of less diameter than the width of the rider strip forming grooves of the mold and which are of greater normal length than the internal circumference of the mold, placing the coils while thus compressed in said grooves with one coil in a groove, holding the coils in laterally centered position in said grooves while the coils are compressed, and then while thus holding the coils forming a tire tread.

7. The method of forming non-skid tire treads with the use of a tire molding machine of the type which has circumferential rider strip forming grooves comprising: longitudinally compressing elongated traction augmented coils the convolutions of which are of less diameter than the width of the rider strip forming grooves of the mold and which are of greater normal length than the internal circumference of the mold, placing the coils while thus compressed in said grooves with one coil in a groove, holding the coils in laterally centered position in said grooves while the coils are compressed, causing uncured rubber to flow into the grooves and around said coils, curing said rubber, and continuing to hold the coils in centered position in the grooves until the rubber has been cured.

8. A tire molding device comprising a cylindrical mold member having a plurality of axially spaced inwardly directed circumferential design forming ribs, and continuous centering means carried by said member and disposed between each two adjacent ribs to support and center an elongated traction augmenting member which is of less dimension in a direction axially of the mold than the distances between ribs.

9. A tire molding device comprising a cylindrical mold member having a plurality of axially spaced inwardly directed circumferential design forming ribs, said mold member having a centering channel disposed between a pair of adjacent ribs, which channel is of a width less than the distance between ribs and serves to support and center an elongated traction augmenting member which is of less dimension in a direction axially of the mold than the distance between ribs.

10. A tire molding device comprising a cylindrical mold member having a plurality of axially spaced inwardly directed circumferential design forming ribs, said mold member having a centering channel disposed between a pair of adjacent ribs and depressed into the material of the mold member, which channel is of less width than the distance between ribs and serves to support and center a wire coil skid resisting member which is of less diameter than the distance between ribs.

11. A mold for tire treads comprising a cylindrical body portion, and a pair of circumferentially extending ribs projecting inwardly from said body portion and having a circumferentially extending tread forming wall portion therebetween, said wall portion having a circumferentially extending and inwardly facing wire coil supporting and centering channel intermediate said ribs.

12. A mold for tire treads comprising a cylindrical body portion, and a pair of circumferentially extending ribs projecting inwardly from said body portion and having a circumferentially extending tread forming wall portion therebetween, said wall portion having a cross-sectional shape which forms a channel having a width substantially equal to the distance between ribs for receiving and centering an elongated traction augmenting member.

13. A mold for tire treads comprising a cylindrical body portion, and a pair of circumferentially extending ribs projecting inwardly from said body portion and having a circumferentially extending tread forming wall portion therebetween, said wall portion having a circumferentially extending and inwardly facing wire coil supporting and centering channel which is arcuate in cross-section intermediate said ribs.

14. A mold for tire treads comprising a cylindrical body portion, and a pair of circumferentially extending ribs projecting inwardly from said body portion and having a circumferentially extending tread forming wall portion therebetween, said wall portion having a circumferentially extending and inwardly facing wire coil supporting and centering channel which is rectangular in cross-section intermediate said ribs.

15. A mold for tire treads comprising a cylindrical body portion, and a pair of circumferentially extending ribs projecting inwardly from said body portion and having a circumferentially extending tread forming wall portion therebetween, said wall portion having a circumferentially extending and inwardly facing wire coil supporting and centering channel which is V-shaped in cross-section intermediate said ribs.

16. A mold for tire treads comprising a cylindrical body portion, and a pair of circumferentially extending ribs projecting inwardly from said body portion and having a circumferentially extending tread forming wall portion therebetween, said wall portion having spaced circumfenertially extending shoulders intermediate said ribs with the spacing between shoulders less than the spacing between ribs to center an elongated traction augmenting member which is of less width than the distance between ribs.

17. A mold for tire treads comprising a cylindrical body portion, and a pair of circumferentially extending ribs projecting inwardly from said body portion and having a circumferentially extending tread forming wall portion therebetween, said wall portion having a circumferentially extending and inwardly facing wire coil centering channel which is of less width than the distance between ribs.

18. A mold for tire treads comprising a cylindrical mold member having a plurality of axially spaced and inwardly directed design forming ribs which extend generally circumferentially of the member, a circumferentially extending wall portion between each pair of ribs and defining tread forming grooves therewith, each of said wall portions being shaped to provide a wire coil centering channel which has its greatest depth at the lateral center of the groove whereby to center each coil with respect to a pair of design forming ribs of the mold member.

19. A mold for tire treads comprising a cylindrical body portion having a plurality of axially spaced and radially inwardly projecting flanges which extend generally circumferentially of the body portion and provide therewith the bottom and side walls of design forming grooves, the bottom of each groove having a circumferentially extending and inwardly facing wire coil supporting channel between each pair of groove forming flanges with the bottom of said channel disposed radially outwardly from the bottom of the groove whereby to position and retain wire coils during the curing of a tread with a portion of each convolution of each coil projecting radially outwardly of the normal road engaging tread surface.

20. In a tire molding machine, a matrix having its tread molding surface formed with at least one circumferentially extending groove having a bottom wall, said bottom wall being formed with a longitudinally extending channel for receiving and positioning an elongated traction augmenting member.

21. In a tire molding machine, a matrix having its tread molding surface formed with at least one circumferentially extending groove having a bottom wall, said bottom wall being formed with a laterally centered, longitudinally extending channel of less width than the width of the groove for receiving and positioning an elongated traction augmenting member.

22. A mold for tire treads comprising a cylindrical body portion, and a pair of circumferentially extending ribs projecting inwardly from said body portion and having a circumferentially extending tread forming wall portion therebetween, said wall portion having a circumferentially extending and inwardly facing wire coil supporting and centering channel the cross section of which is in the form of an arc, the radius of said arc being substantially the same as the radius of a convolution of the wire coil to be supported, said channel being located intermediate said ribs.

23. A mold for tire treads comprising a cylindrical body portion adapted to be heated and having a plurality of axially spaced and radially inwardly projecting flanges which extend generally circumferentially of the body portion and provide therewith the bottom and side walls of design forming grooves, the bottom of each groove having a circumferentially extending and inwardly facing wire coil supporting channel between each pair of groove forming flanges with the bottom of said channel disposed radially outwardly from the bottom of the groove whereby to position and retain wire coils during the curing of a tread with a portion of each convolution of each coil projecting radially outwardly of the normal road engaging tread surface, each channel having its cross section in the form of an arc with the radius of said arc substantially the same as the radius of a convolution of the wire coil to be supported, whereby the coils are centered in the grooves and serve to speed up the transfer of heat from the mold body portion into the tire tread to be formed.

24. The method of forming non-skid tire treads with the use of a tire molding machine of the type which has a mold portion provided with circumferential rider strip forming grooves having bottoms and having channels in said bottoms comprising: placing metal elongated traction augmenting members in said grooves with each groove accommodating one of said elongated traction augmenting members, causing portions of the traction augmenting members to project into the channels so that said portions project into the mold portion farther than the bottoms of the grooves and in laterally centered position in said grooves, heating the mold portions into which said portions of the traction augmenting members project, holding said elongated traction augmenting members in said position in said grooves, and then while thus holding the traction augmenting members forming a tire tread while heat is being rapidly conducted into said tread by said projecting portions of the elongated traction augmenting members.

25. The method of forming non-skid tire treads with the use of a tire molding machine of the type which has a mold portion provided with circumferential rider strip forming grooves having bottoms and having channels in said bottoms comprising: placing metal coils in said grooves with each groove accommodating one of said coils, causing portions of the convolutions of the coils to project into the channels so that said portions of the convolutions project into the mold portion farther than the bottoms of the grooves and in laterally centered position in said grooves, heating the mold portions into which said portions of the convolutions of the coils project, holding said coils in said position in said grooves, and then while thus holding the coils, forming a tire tread while heat is being rapidly conducted into said tread by said projecting portions of the convolutions of the metal coils.

26. The method of forming non-skid tire treads with the use of a tire molding machine of the type which has a mold portion provided with circumferential rider strip forming grooves having bottoms and having channels in said bottoms comprising: longitudinally compressing metal coils which are of greater normal length than the internal circumference of the mold, placing the coils while thus compressed in said grooves with one coil in a groove, causing portions of the convolutions of the coils to project into the channels so that said portions of the convolution project into the mold portion farther than the bottoms of the grooves while in laterally centered position in said grooves, maintaining the coils in said position in said grooves while thus compressed, causing uncured rubber to flow into the grooves and around said coils, heating the mold portions into which said portions of the convolutions of the coils project to cure said rubber, and continuing to thus hold the coils in the grooves until the rubber has been cured while heat is being rapidly conducted into said rubber by said projecting portions of the convolutions of the coils.

DAVID E. CROOKER.

REFERENCES CITED

The following references are of record in the file of this patent:

UNITED STATES PATENTS

| Number | Name | Date |
|---|---|---|
| 2,034,618 | Hawkinson | Mar. 17, 1936 |
| 2,155,906 | Rihn et al. | Apr. 25, 1939 |
| 2,339,696 | Hawkinson | Jan. 18, 1944 |
| 2,479,474 | Crooker | Aug. 16, 1949 |